(12) United States Patent
Yeh et al.

(10) Patent No.: US 8,242,877 B2
(45) Date of Patent: Aug. 14, 2012

(54) TOUCH PANEL WITH DISCONTINUOUS CHAIN OF RESISTANCES

(75) Inventors: Herng-Ming Yeh, Taoyuan Hsien (TW); Yi-Ta Chen, Hsinchu (TW)

(73) Assignee: Higgstec Inc., Taoyuan Hsien (TW)

( * ) Notice: Subject to any disclaimer, the term of this patent is extended or adjusted under 35 U.S.C. 154(b) by 425 days.

(21) Appl. No.: 12/707,099

(22) Filed: Feb. 17, 2010

(65) Prior Publication Data
US 2010/0214263 A1    Aug. 26, 2010

(30) Foreign Application Priority Data
Feb. 20, 2009   (TW) ................. 98105411 A (51) Int. Cl.
*H01C 3/06*    (2006.01)
(52) U.S. Cl. ..... 338/210; 345/173; 345/178; 178/18.01; 178/18.05
(58) Field of Classification Search ............. 338/210, 338/226; 345/173, 175, 178; 178/18.03, 178/18.05
See application file for complete search history.

(56) References Cited

U.S. PATENT DOCUMENTS

| | | | | |
|---|---|---|---|---|
| 4,822,957 A * | 4/1989 | Talmage et al. | ........... | 178/18.05 |
| 5,045,644 A * | 9/1991 | Dunthorn | .................. | 178/18.05 |
| 6,163,313 A * | 12/2000 | Aroyan et al. | ............... | 345/173 |
| 6,549,193 B1 * | 4/2003 | Huang et al. | ................. | 345/173 |
| 6,593,916 B1 | 7/2003 | Aroyan | | |
| 7,327,352 B2 * | 2/2008 | Keefer et al. | ................ | 345/173 |
| 7,952,567 B2 * | 5/2011 | Aroyan et al. | ............... | 345/174 |
| 2006/0119587 A1 | 6/2006 | Aroyan et al. | | |

* cited by examiner

*Primary Examiner* — Kyung Lee
(74) *Attorney, Agent, or Firm* — Rabin & Berdo, P.C.

(57) ABSTRACT

The disclosure is related to a touch panel with discontinuous chain of resistances. It is formed by an internal series of electrodes of the conducting layer formed by a chain of discontinuous resistances. The design of the chain of discontinuous resistances can compensate for the voltage compensation by the voltage drop generated by the distance of chain of electrodes wherein the chain of discontinuous resistances is located at the interface of the series electrodes, and the length chain of discontinuous resistances is calculated by the specific equation.

8 Claims, 9 Drawing Sheets

TOUCH PANEL WITH DISCONTINUOUS CHAIN OF RESISTANCES

CROSS-REFERENCES TO RELATED APPLICATIONS

This non-provisional application claims priority under 35 U.S.C. §119(a) on Patent Application No. 98105411 filed in Taiwan, R.O.C. on Feb. 20, 2009, the entire contents of which are hereby incorporated by reference.

BACKGROUND

1. Technical Field

The disclosure relates to a touch panel, in particular, to a touch panel with discontinuous chain of resistances.

2. Related Art

Nowadays, the most popular touch panels sold in the market are generally classifiable as resistive-type and capacitive-type touch panels. The resistive-type also can be classified into 4-line resistive-type, 5-line resistive-type, 6-line resistive-type and 8-line resistive-type in early days. The capacitive-type can be classified into surface capacitance touch screen (SCT) and projective capacitance touch screen (PCT), which are also referred to as digital-touch technology. The resistive-type and the surface capacitance touch screen (SCT) are generally referred to as analog-touch technology.

The uniform electrical field of conventional analog touch technique is created by the pattern arrangement of the resistor devices around the edges. With production requirements increasing and the booming development of touch panel techniques, the present technique is leading the way in terms of space reduction of the resistor around the edges. Furthermore, it requires a smoother equal potential field, which improves the accuracy of touch panel and may be applied widely.

Figure 1A:
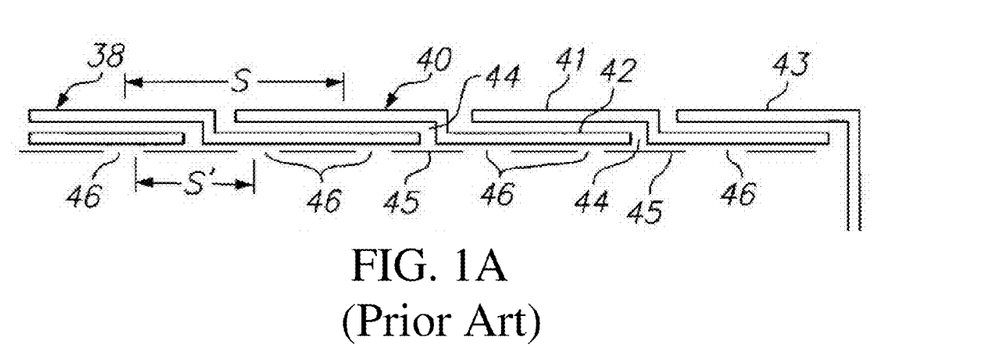
FIG. 1A is a schematic diagram of the first embodiment of the electrode pattern of the conducting frame applied to a touch panel of the related art.
Figure 1B:
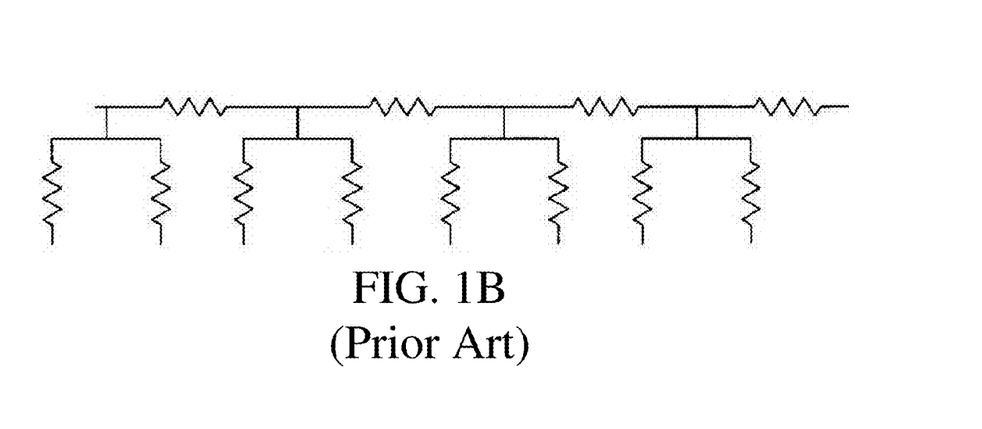
FIG. 1B is a schematic diagram of an equivalent circuit of the electrode pattern of the conducting frame of FIG. 1A.

Please refer to U.S. Pat. No. 6,593,916, entitled a "Touchscreen having multiple parallel connections to each electrode in a series resistor chain on the periphery of the touch area". It disclosed two ways to improve the ripple effect generated by the frame, as shown in FIG. 1 and FIG. 2. In pattern shown in FIG. 1, the chain of series resistances is formed by the gaps 44 and the series connection of the series electrode 40 on the conducting layer. The spacing between the series electrodes 40 is S, which includes the external part and internal part, for example, the external part 38, 41, 43 and internal part 42. The internal part is formed by every two gaps 44 formed as two insulated gaps 45. One of the insulated gaps 45 is located at the gaps 44 and there is discontinuous resistance 46 between the gap of the insulated gaps 45. The length is approximately equal, the spacing is S', and the equivalent resistance is shown in FIG. 1B.

Figure 2A:
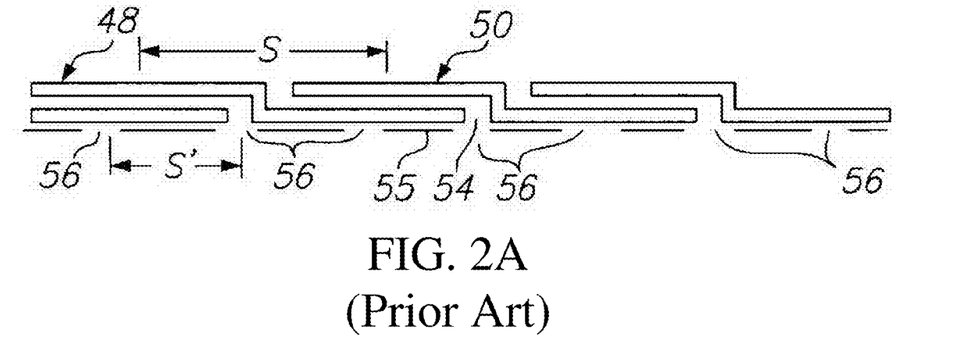
FIG. 2A is a schematic diagram of the second embodiment of the electrode pattern of the conducting frame applied for touch panel of the related art.
Figure 2B:
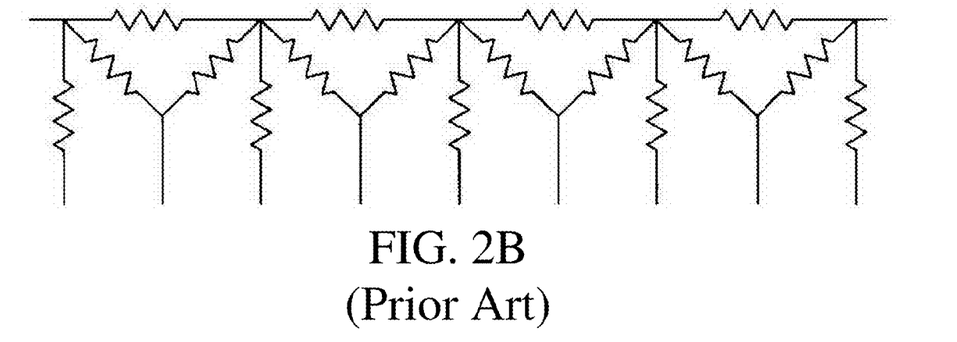
FIG. 2B is a schematic diagram of equivalent circuit of the electrode pattern of the conducting frame of FIG. 2A.

Please refer to the pattern shown in FIG. 2A, in which the chain of series resistances is formed by the gaps 54 and the series connection of the series electrode 48, 50 on the conducting layer. The spacing between the series electrodes 40 is S, which includes the external part and internal part. The internal part is formed by every two gaps 54 formed as two insulated gaps 55. Every insulated gap 55 is located at the gaps 54 and there is a discontinuous resistance 56 between the gap of the insulated gaps 55. The length is approximately equal, the spacing is S', and the equivalent resistance is shown as FIG. 2B.

Figure 3A:
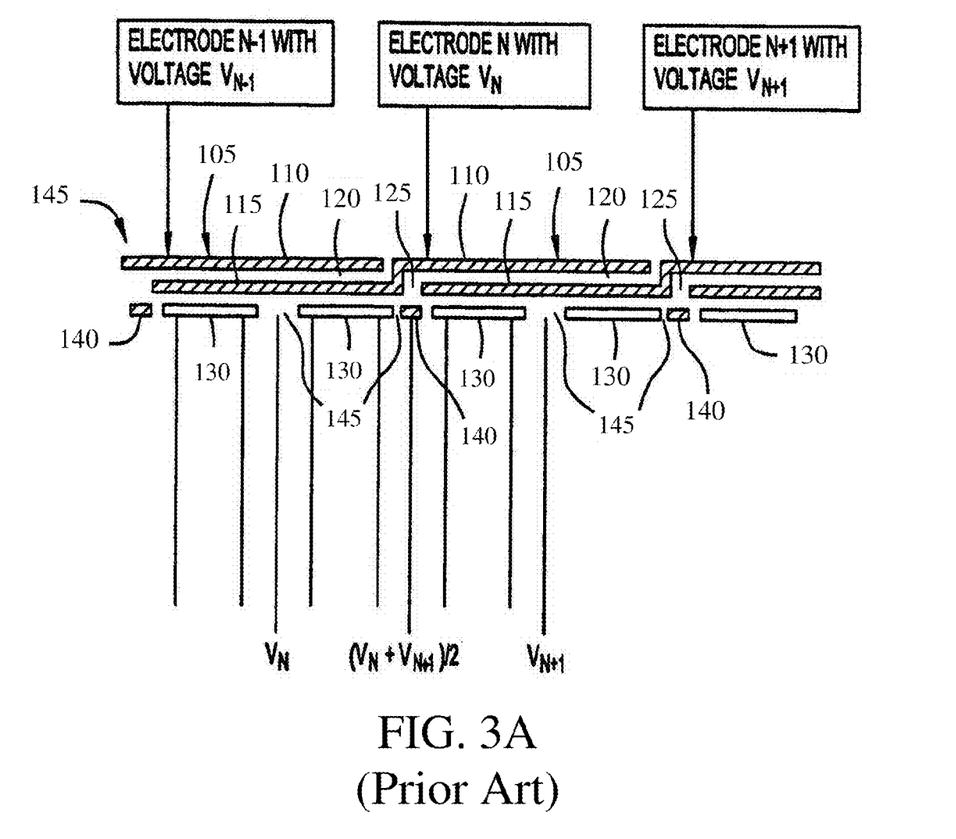
FIG. 3A is a schematic diagram of the third embodiment of the electrode pattern of the conducting frame applied for touch panel of the related art.
Figure 3B:
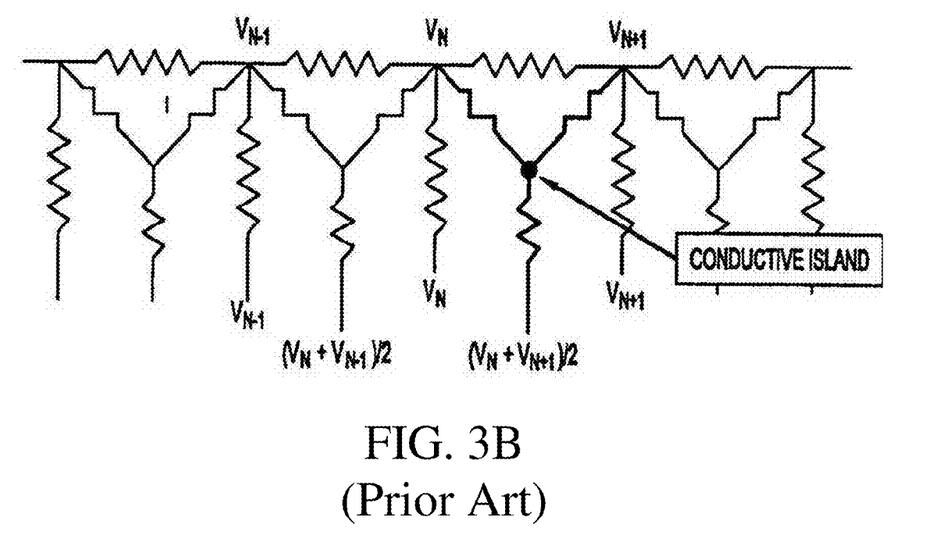
FIG. 3B is a schematic diagram of equivalent circuit of the electrode pattern of the conducting frame of FIG. 3A.

Please refer to U.S. Pat. No. 2006/0119587, entitled an "Improved electrodes pattern", as shown in FIG. 3A. The chain of series resistances 145 is formed by the gaps 125 and the series connection of the series electrode 105 on the conducting layer. The series electrode includes an external part 110 and internal part 115. A gap 120 is formed between external part 110 and internal part 115. The internal part 115 is formed by using the way of two insulated gaps 130 formed at every two gaps 125. The discontinuous resistances 145 are located between the insulated gaps 130. The length is approximately equal. To improve the ripple effect, the design of conducting island 150 inserted between the gaps is performed at the gap 125 of series electrodes 105. If the voltage of the discontinuous resistances 145 is $V_N$, $V_{N+1}$, the voltage of the inserted conducting island 140 is equalized as $(V_N+V_{N+1})/2$, and the equivalent resistance is shown as FIG. 3B.

Many companies are devoted to the research of the resistor pattern around the edges. However, the improvement of the electrical field of the edge electrodes has yet to be achieved.

SUMMARY

Accordingly, the disclosure is directed to a touch panel with discontinuous chain of resistances. By using the voltage equalization provided from the discontinuous chain of resistances and the uniformity provided from the equalized electrodes, the disclosure provides a very narrow arranged space for lines and a superior linear accuracy, error $\leq 1\%$, for the area which is closed to the circuit edge.

It is another objective of the disclosure to provide a touch panel with discontinuous chain of resistances by using the discontinuous chain of resistance, the equalized electrode and the compact combination of the chain of series electrodes which are around the conducting layer. The disclosure meets the goals of frame reduction and increasing the size of the touch area.

To achieve the above objectives, the disclosure provides a touch panel with discontinuous chain of resistances, includes a substrate; a conducting layer, formed on the substrate, the conductor layer includes a internal contact area; a plurality of corner electrodes, formed at the corners of the conducting layer; a chain of series electrodes, included of a plurality of electrodes, formed on the edge of the conducting layer and connected to the plurality of corner electrodes, the plurality of corner electrodes generates a rectangular electrical field by performing a bias voltage, each of the plurality of electrodes provides an internal part faced to the internal contact area and a gap between each other; a discontinuous chain of resistances, included of a plurality of discontinuous resistances, formed on the conducting layer, connected to the chain of series electrodes, arranged in parallel with the chain of series electrodes and isolated from the internal contact area.

Moreover, the touch panel further includes a second chain of equalized electrodes, included of the gaps of a plurality of the second equalized electrode, formed at the gaps of every two of the first equalized electrodes to equalize the output voltage of the chain of equalized electrodes.

To ensure good compensation and the equalization of electrical potential generated by rectangular electrical field, the length of the discontinuous resistances is calculated using the equation $Y=aX^2+b$, wherein the X is the number of the plurality of electrodes calculated from the plurality of corner electrodes. The "b" value is the default value of the experiment. The value is calculated from a maximum value of a default segment, Ymax, which is determined by the length of center electrode of the chain of series electrodes located at two corner electrodes.

Moreover, the plurality of discontinuous and insulated segments of the chain of discontinuous resistances are arranged without chinks with the internal part of the chain of series electrodes and the chain of equalized electrodes.

The detailed features and advantages of the disclosure will be described in detail in the following embodiments. Those skilled in the arts can easily understand and implement the content of the disclosure. Furthermore, the relative objectives and advantages of the disclosure are apparent to those skilled in the arts with reference to the content disclosed in the specification, claims, and drawings.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

The disclosure relates to a new design pattern and structure. By using the low capacitance between the transparent conducting film with high impedance and the touch object (inserted a thick film of transparent and isolated material), the touch coordinate of the touch object can be detected precisely in the case of the application of detection of the capacitor touch panel. On the other hand, by using the voltage level detected when the touch object contacts the touch panel, the touch coordinate of the touch object can be detected precisely in the case of the application of detection of the resistor touch panel.

Figure 4:
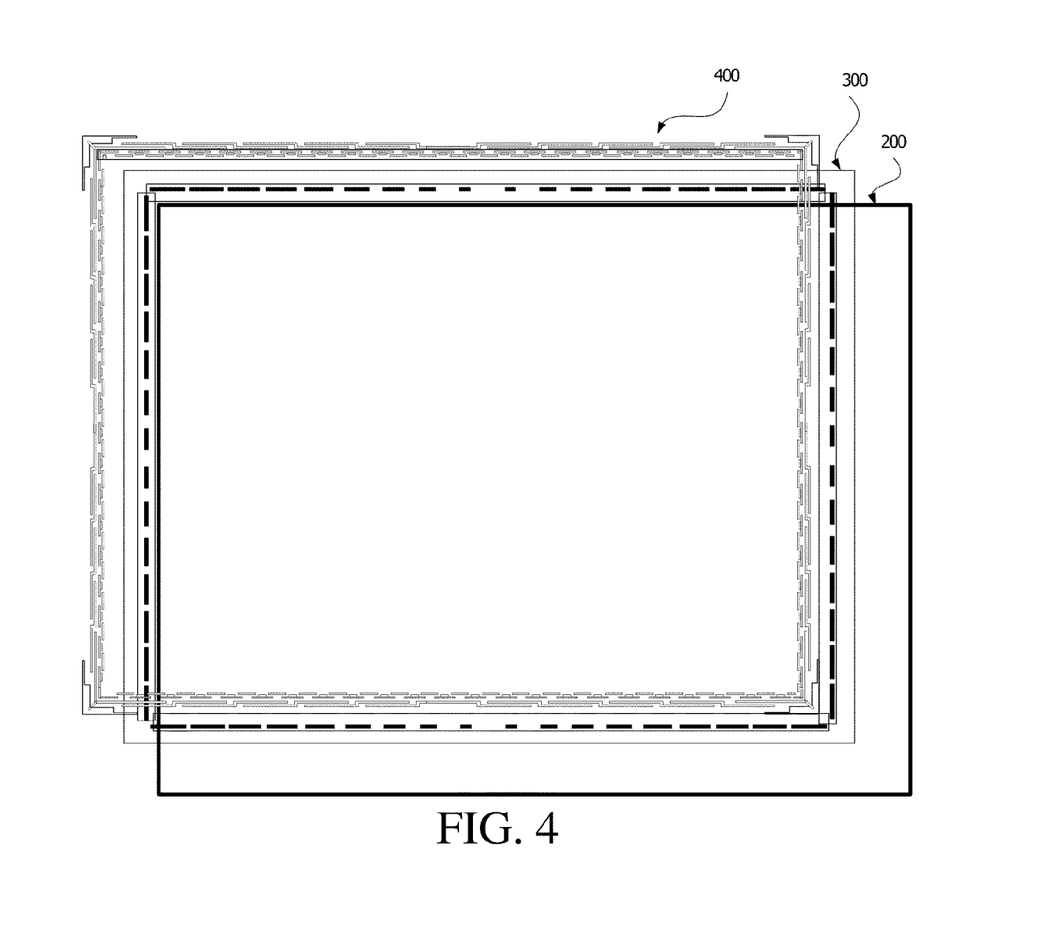
FIG. 4 is a schematic diagram of layer arrangement of the touch panel of the disclosure.

Firstly, please refer to FIG. 4, which is a schematic diagram of layer arrangement of the touch panel and also includes a basic electrode frame layer 400 of the disclosure, a conducting layer 300 and a substrate 200. Moreover, the pattern of the electrode frame layer 400 is formed on the conducting layer 300 by using a screen printing procedure, and selected from a kind of environmental and unleaded silver glue at a high temperature. After fusing the silver on the conducting layer 300 with a temperature above 500° C., the conducting interface resistance is quite small (it can be treated as equivalent to zero). It possesses high environmental temperature tolerance. The chemical tolerance is increased after the crystallization of the silver conductor wires and the conducting layer 300 in a high temperature. In addition, the silver conductor wires can be replaced and selected from the groups of molybdenum/aluminum/molybdenum metal layers and chromium conductor wires. The conducting layer can be adhered to the metal with high impedance, which can meet the goal of low loss and low current distribution.

In the structure, the substrate 200 is selected as glass, the conducting layer 300 is formed by using sputtering, and the pattern on the conducting layer 300 is formed by using an etching process or laser process. In the following steps, the electrode frame layer 400 is formed by the screen printing of silver glue at a high temperature. Moreover, the substrate 200 can be selected from other material, for example, flexible substrate and the adapted process of flexible substrate for the fabrication of the electrode pattern.

Figure 5:
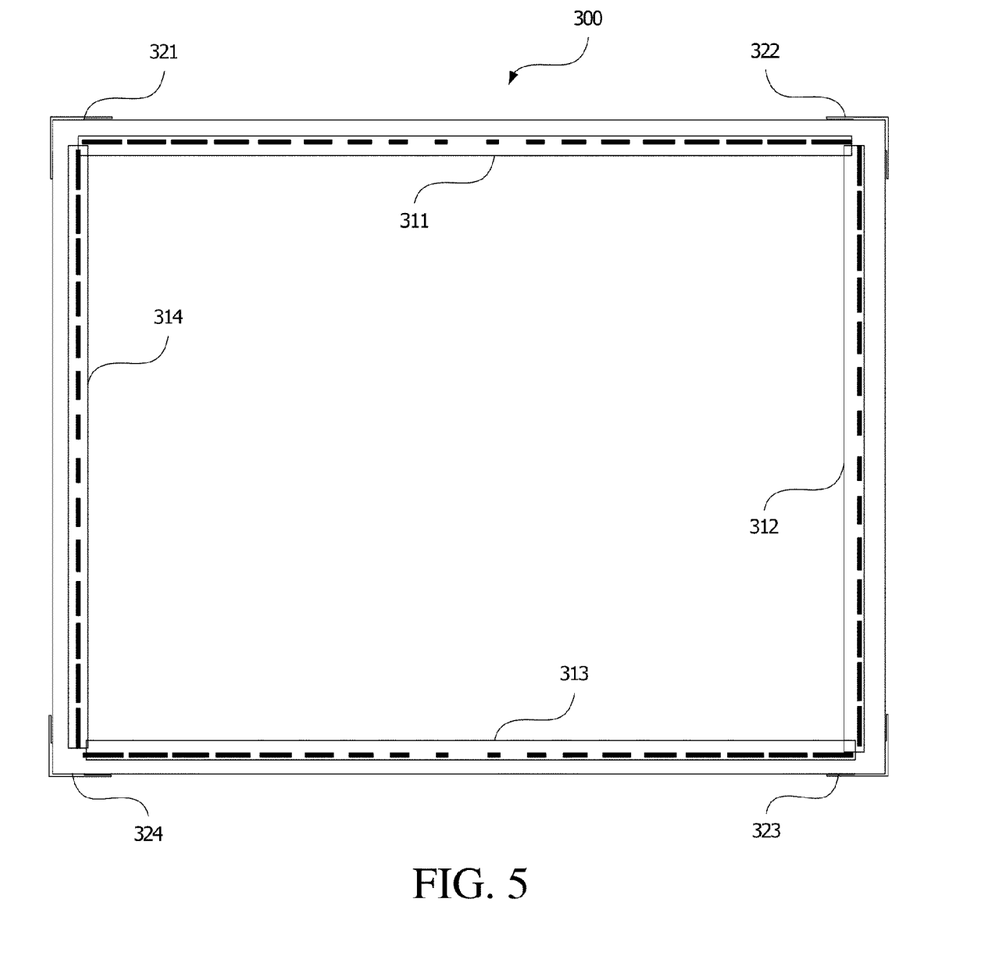
FIG. 5 is a schematic diagram of structure of the conducting layer 300 of the disclosure.

Now please refer to FIG. 5, which is a schematic diagram of structure of the conducting layer 300 of the disclosure. The black area is distributed on the insulated parts around the conducting layer 311, 312, 313, 314. The insulated parts in x-axis are 312, 314, and in y-axis are 311, 313. The insulated parts 311, 312, 313, 314 are fabricated by using an etching process or laser process. The insulated parts are used for the isolation of the electrode layer of the electrode frame layer 400. The un-etched insulated parts are formed as the conducting discontinuous chain of resistances which provide the average voltage level of each electrode output and generate a uniform electrical field distribution. Moreover, the length of the un-etched discontinuous chain of resistances is calculated by equation of $Y=aX^2+b$, as the non-uniform distribution of insulated parts shown in the FIG. 5. The detail derivations of parameters are described in the followings.

Moreover, the four corners 321, 322, 323, 324 of conducting layer 300 are the location of the four corner electrodes.

Figure 6:
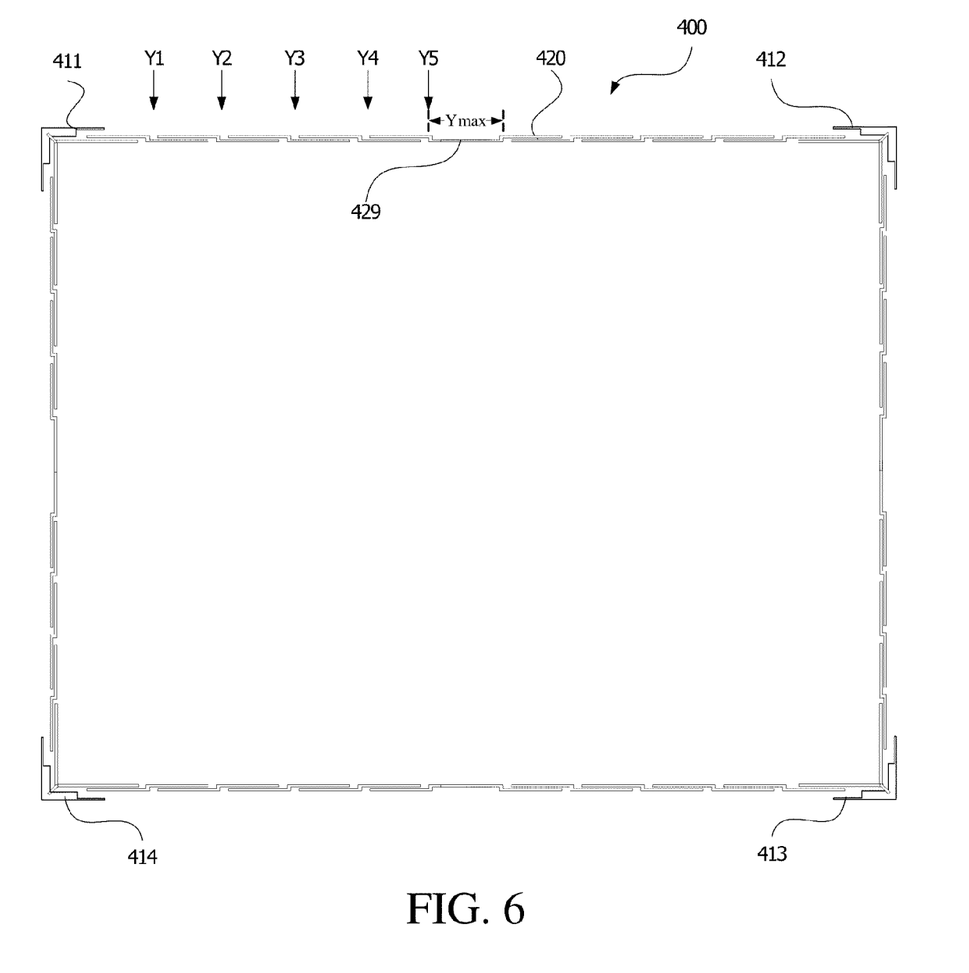
FIG. 6 is a schematic diagram of structure of the electrode frame layer 400 of the disclosure.

Now please refer to FIG. 6, which is a schematic diagram of structure of the electrode frame layer 400 of the disclosure, which includes four corner electrodes 411, 412, 413, 414 and the chain of series electrodes 420 connected in series with four corner electrodes. In the embodiment of FIG. 6, the stacked structure of the external part and internal part are formed by the chain of series electrodes 420 and a plurality of Z-shaped electrodes. The gaps are formed between every two electrodes, which are also prepared for the space of series resistances. Therefore, the gap between the chains of series electrodes 420 are formed as the chain of series resistances after the electrode frame 400 formed on the conducting layer 300. The gaps provide the series connection of voltage supply transmitted from the corner electrodes.

In addition, the chain of series resistances can be other types of structures, for example, S-shaped, X-shaped and continuous segment, which are considered for the continuous arrangement of voltage. The amount of Z-shaped electrodes of the chain of series electrodes 420 designed dependents on the touch panel size. As the touch panel size increases, it can be designed as 3, 5, 7, 9, 11, 13, 15, 17, . . . (2n+1), n>1 at every orientation. For example, FIG. 6 is the embodiment of nine Z-shaped electrodes where the center electrode is formed by connecting two Z-shaped electrodes oppositely. The length is Ymax, and electrodes Y1, Y2, Y3, Y4, Y5 are arranged from left side to right side, and so on. Since the input voltage of chain of series electrodes is transmitted from the corner electrodes, the voltage drop occurs within every Z-shaped electrode while the current passes through the chain of series resistances. In order to provide a uniform electrical field distribution of conducting layer 300, the non-uniform resistances in the disclosure are formed by the discontinuous chain of resistances which formed by the insulated parts 311, 312, 313, 314 on the conducting layer 300.

As shown in FIG. 4 to FIG. 6, these are the electrode structures of the disclosure. The detailed structure of the improved electrode pattern of the disclosure is described in the following paragraphs.

Figure 7:
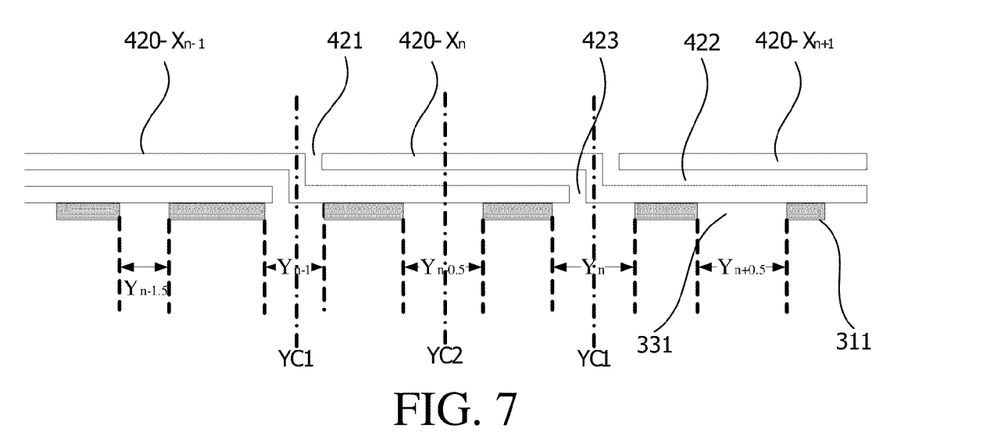
FIG. 7 is a amplified diagram of the electrode frame layer 400 formed on the conducting layer 300 of the disclosure.

Now please refer to FIG. 7, which is an amplified diagram of the electrode frame layer 400 formed on the conducting layer 300 of the disclosure. The discontinuous resistances 331 are formed between the insulated 311 and the Z-shaped electrodes. It is not only the resistance formed by the conducting layer 300 but the conducting part of the Z-shaped electrodes. Moreover, the discontinuous resistances 331 are arranged without chinks with the Z-shaped electrodes. As shown in the FIG. 7, all of the internal part of every Z-shaped electrodes possesses one section of the discontinuous resistances 331. However, the center of perpendicular part of the Z-shaped electrodes corresponds to one section of the discontinuous resistances 331.

Moreover, since the chain of discontinuous resistances provides different resistances for the voltage output of the Z-shaped electrodes as voltage compensation, the output voltage provided by each of the Z-shaped electrodes across the discontinuous resistance sections has the consistent value. It can effectively reduce the ripple effect at the edge of electrical field.

The length of the discontinuous resistances 331 is calculated by the equation of $Y=aX^2+b$, described as follows:

1. X is the Z-shaped electrodes counted from the corner electrodes, for example, there are five Z-shaped electrodes, $X1=1, X2=2, X3=3, X4=4, X5=5$ as counted from the corner electrodes 411.

2. "b" value is the default value derived from the experiment and statistics, the preferred value is between 0.3 to 2.0 mm.

3. "a" value is calculated from Ymax, and its magnitude is derived from the length of center electrode 429 at the top in FIG. 6. The length of the center electrode depends on the touch panel size and amount of the chain of series electrodes. The preferred value of Ymax is the value remaining after subtracting 0.1 mm from both sides of the electrode length.

4. After obtaining Ymax, "b" and X, the value is derived.

Thus the length of $Y_{n-1}$ is calculated by $Y_{n-1}=a(n-1)^2+b$. The length of $Y_n$ is calculated by $Y_n=a(n)^2+b$. The length between $Y_{n-0.5}$ and $Y_{n-1}$ is calculated using the dual method of I. $X=(X_{n-1}+X_n)/2$, then substituted into the equation II. $Y=(Y_{n-1}+Y_n)/2$. In practical terms, the first equation, I, is preferred.

The preferred position of the discontinuous resistances 331 is determined by the perpendicular part center of the Z-shaped electrodes YC1 and the internal part of the center YC2 (the center of two perpendicular centers). The center of the first equalized electrode is corresponded to the center of the discontinuous resistances. Certainly, a minor error produced by the manufacturing process, or an off center arrangement in design, are also provided in the disclosure, which can meet the goal of the disclosure.

Moreover, in practical terms, the discontinuous resistances can also be arranged by the internal part of the Z-shaped electrodes. In the other words, the disclosure is to arrange a discontinuous resistance between every electrode of the chain of series electrodes. Furthermore, at least one of discontinuous resistances also can be arranged in the internal part of every electrode.

If the internal part of electrodes of every series electrode is designed using the plurality of discontinuous resistances, that is, to arrange the plurality of discontinuous resistances at the perpendicular center on the Z-shaped electrodes YC1 (this can also be the internal part of the electrode between electrodes, as the other electrode structure is adopted), then the length calculation of the discontinuous resistances located between the electrodes can also be derived by means of the two kinds of calculation as mentioned above. For example, the preferred method is to arrange the discontinuous resistances with the same distance to the adjacent electrodes by arranging two discontinuous resistances in the internal part of Z-shaped electrodes. If the length is between $Y_{n-1}$ and $Y_n$, such as, $Y_{n-0.67}$ and $Y_{n-0.33}$, then they are either determined as $Y_{n-0.67}=a(n-0.67)^2+b$ and $Y_{n-0.33}=a(n-0.33)^2+b$ or $Y_{n-0.67}=(Y_{n-1}*2+Y_n*1)/3$ and $Y_{n-0.33}=(Y_{n-1}*1+Y_n*2)/3$, where the former is preferred.

The discontinuous resistances derived by using the different ways can also be applied in the disclosure. The using of Z-shaped electrodes is an embodiment of the disclosure. The shapes of different chain of series electrodes can also be the embodiment in the disclosure. Since the principle is the same, no more than necessary is declared in the following paragraphs.

The pattern design of the electrode frame 400 and the conducting layer 300 can equalize the resistances between the corner electrodes of 411, 412, 413 and 414. Therefore, the best parallel line distribution can be derived even if the voltage contours in x-axis is located at the edge of lines. Similarly, best parallel line distribution can be derived for the voltage contours in y-axis.

The embodiment in FIG. 7 describes the fact that the insulated part 311 of the discontinuous resistance 331 is formed at the edge of internal part of the chain of series electrodes 420. That is, to form a good insulation, the insulated part 311 is connected tightly with the chain of series electrodes 420. This kind of structure can effectively and precisely provide the voltage of the Z-shaped electrodes to the first chain of series electrodes 431.

However, fabrication errors may still occur during manufacturing. This means the insulated part 311 cannot be formed precisely at the internal part edge of the chain of series electrodes 420.

Figure 8:
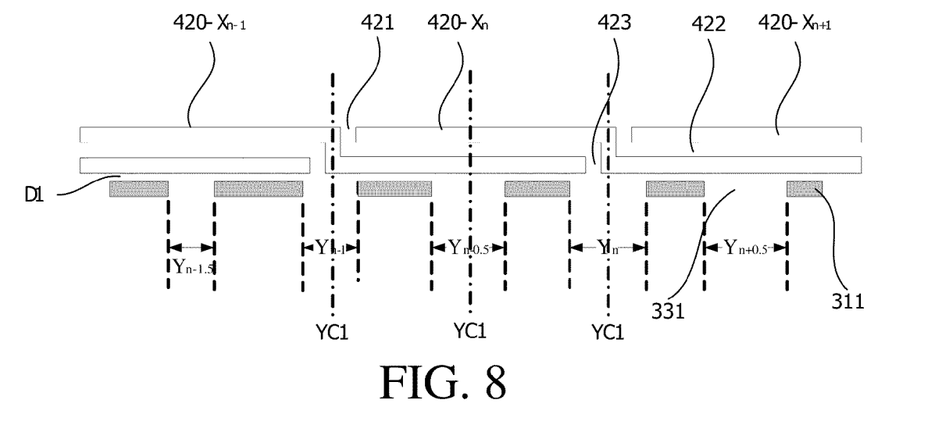
FIG. 8 is an amplified diagram of the second embodiment of the electrode frame layer 400 formed on the conducting layer 300 of the disclosure.

Please refer to FIG. 8, which is an amplified diagram of the second embodiment of the electrode frame layer 400 formed on the conducting layer 300 of the disclosure. The internal part of the chain of series electrodes 420 is formed by the insulated part 311 of the discontinuous resistances 331. A gap D1 is formed between the insulated part 311 and the chain of series electrodes.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A touch panel with discontinuous chain of resistances, comprising:
   a substrate;
   a conducting layer, formed on the substrate, the conducting layer comprises a internal contact area;
   a plurality of corner electrodes, formed at the corners of the conducting layer;
   a chain of series electrodes, comprising a plurality of electrodes formed on the edge of the conducting layer and connected to the plurality of corner electrodes, the plurality of corner electrodes generate a rectangular electrical field by performing bias voltage, each of the plurality of electrodes providing an internal part faced to the internal contact area and having a gap between each other; and a discontinuous chain of resistances, comprising a plurality of discontinuous resistances, formed on the conducting layer, connected to the chain of series electrodes and arranged in parallel, the internal part of each of the plurality of electrodes is adjacent to at least one of the plurality of discontinuous resistances and the gap is electrical connected to the plurality of discontinuous resistances, the length of the plurality of discontinuous resistances Y is $aX^2+b$, where "a" and "b" values are constant, the X is the number of the plurality of electrodes calculated from the plurality of corner electrodes which are connected to the chain of series electrodes.

2. The touch panel with discontinuous chain of resistances according to claim 1, wherein the "b" value is from 0.3 to 2 mm.

3. The touch panel with discontinuous chain of resistances according to claim 1, wherein the "a" value is determined by the length of a center electrode of the chain of series electrodes Ymax, the "a" is $(Ymax-b)/X^2$.

4. The touch panel with discontinuous chain of resistances according to claim 1, wherein the "a" is determined by the length of a center electrode of the chain of series electrodes Ymax subtract 0.2 mm, the "a" is $((Ymax-0.2)-b)/X^2$.

5. The touch panel with discontinuous chain of resistances according to claim 1, wherein the plurality of discontinuous resistances located at the gap corresponds to the center of the plurality of discontinuous resistances and the electrodes.

6. The touch panel with discontinuous chain of resistances according to claim 1, wherein the plurality of corner electrodes and the chain of series electrodes are selected from the groups of silver conductor wires, molybdenum/aluminum/molybdenum metal layers and chromium conductor wires.

7. The touch panel with discontinuous chain of resistances according to claim 1, wherein the plurality of corner electrodes and the chain of series electrodes are the silver conductor wires which are fabricated by silver glue at a temperature above 500° C.

8. The touch panel with discontinuous chain of resistances according to claim 1, wherein the discontinuous chain of resistances are comprised of the plurality of discontinuous and insulated segments formed on the conducting layer, and the plurality of discontinuous and insulated segments are arranged without chinks with the internal part of the chain of series electrodes.

* * * * *